(12) United States Patent
Kitagawa et al.

(10) Patent No.: US 12,117,197 B2
(45) Date of Patent: Oct. 15, 2024

(54) VENTILATION CONTROL APPARATUS AND VENTILATION SYSTEM

(71) Applicant: DAIKIN INDUSTRIES, LTD., Osaka (JP)

(72) Inventors: Keita Kitagawa, Osaka (JP); Youichi Handa, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 774 days.

(21) Appl. No.: 17/272,899

(22) PCT Filed: Aug. 30, 2019

(86) PCT No.: PCT/JP2019/034180
§ 371 (c)(1),
(2) Date: Mar. 2, 2021

(87) PCT Pub. No.: WO2020/050174
PCT Pub. Date: Mar. 12, 2020

(65) Prior Publication Data
US 2021/0215377 A1     Jul. 15, 2021

(30) Foreign Application Priority Data
Sep. 3, 2018 (JP) .................................. 2018-164952

(51) Int. Cl.
*F24F 11/74* (2018.01)
*F24F 11/00* (2018.01)
(Continued)

(52) U.S. Cl.
CPC .......... *F24F 11/74* (2018.01); *F24F 11/0001* (2013.01); *G06T 7/70* (2017.01);
(Continued)

(58) Field of Classification Search
None
See application file for complete search history.

(56) References Cited

U.S. PATENT DOCUMENTS 6,145,751 A * 11/2000 Ahmed .............. G05D 23/1919
236/78 B
2013/0048263 A1 * 2/2013 Nouvel .................... F24F 11/63
165/237

(Continued)

FOREIGN PATENT DOCUMENTS

CN     106152378 A     11/2016
JP      4-174233 A      6/1992
(Continued)

OTHER PUBLICATIONS

International Search Report of corresponding PCT Application No. PCT/JP2019/034180 dated Nov. 12, 2019.
(Continued)

*Primary Examiner* — David Earl Ogg
(74) *Attorney, Agent, or Firm* — Global IP Counselors, LLP (57) ABSTRACT

A ventilation device control apparatus includes an image acquisition unit, a first calculation unit, and a ventilation control unit. The image acquisition unit acquires a captured image from an image capturing device that captures an image of a target space. The first calculation unit calculates a metabolic rate equivalent amount of a person in the target space, based on the captured image acquired by the image acquisition unit. The ventilation control unit adjusts a ventilation volume of the target space by a ventilation device that ventilates the target space, based on the metabolic rate equivalent amount calculated by the first calculation unit. A ventilation system further includes the image capturing device and the ventilation device.

14 Claims, 3 Drawing Sheets

(51) Int. Cl.
*F24F 120/12* (2018.01)
*F24F 120/14* (2018.01)
*G06T 7/70* (2017.01)

(52) U.S. Cl.
CPC ....... *F24F 2120/12* (2018.01); *F24F 2120/14* (2018.01); *G06T 2207/30196* (2013.01)

(56) References Cited

U.S. PATENT DOCUMENTS

| | | | |
|---|---|---|---|
| 2014/0148706 A1* | 5/2014 | Van Treeck | F24F 11/64 600/474 |
| 2015/0045981 A1* | 2/2015 | Mise | G05D 23/19 700/300 |
| 2016/0018123 A1* | 1/2016 | Yabunouchi | F24F 11/64 700/278 |
| 2016/0363340 A1* | 12/2016 | Shikii | F24F 11/74 |
| 2017/0318701 A1* | 11/2017 | Steiner | F24F 11/88 |
| 2017/0370603 A1 | 12/2017 | Raman et al. | |

FOREIGN PATENT DOCUMENTS

| | | | |
|---|---|---|---|
| JP | 5-223299 A | | 8/1993 |
| JP | 9-184649 A | | 7/1997 |
| JP | 2001074292 A | * | 3/2001 |
| JP | 2006220405 A | * | 8/2006 |
| JP | 2010-25359 A | | 2/2010 |
| JP | 2017-3202 A | | 1/2017 |
| JP | 2017-15384 A | | 1/2017 |
| JP | 2017003203 A | * | 1/2017 |
| JP | 2018-4132 A | | 1/2018 |
| KR | 20090085895 A | * | 8/2009 |
| KR | 20100119058 A | * | 11/2010 |
| WO | 2017/042908 A1 | | 3/2017 |

OTHER PUBLICATIONS

International Preliminary Report of corresponding PCT Application No. PCT/JP2019/034180 dated Mar. 18, 2021.
1 European Search Report of corresponding EP Application No. 19 85 6808.1 dated Oct. 4, 2021.

\* cited by examiner

VENTILATION CONTROL APPARATUS AND VENTILATION SYSTEM

CROSS-REFERENCE TO RELATED APPLICATIONS

This U.S. National stage application claims priority under 35 U.S.C. § 119(a) to Japanese Patent Application No. 2018-164952, filed in Japan on Sep. 3, 2018, the entire contents of which are hereby incorporated herein by reference.

BACKGROUND

Field of the Invention

The present invention relates to a ventilation control apparatus that controls a ventilation device, and a ventilation system

Background Information

Conventionally, as in JP H9-184649 A, there is known a ventilation control apparatus that changes a ventilation volume in accordance with the presence or absence of a person and a carbon dioxide concentration detected by a sensor.

SUMMARY

However, a required ventilation volume is not uniformly determined only by the presence or absence of a person. Further, a carbon dioxide concentration in a space may vary depending on a position in the space, and a measured value of the sensor may not be a representative value of the carbon dioxide concentration in the space. Therefore, even if the ventilation volume is changed in accordance with the presence or absence of a person or a carbon dioxide concentration detected by the sensor, excess or deficiency in the ventilation volume may occur.

A ventilation device control apparatus of a first aspect includes an image acquisition unit, a first calculation unit, and a ventilation control unit. The image acquisition unit acquires a captured image from an image capturing device that captures an image of a target space. The first calculation unit calculates a metabolic rate equivalent amount of a person in the target space, on the basis of the captured image acquired by the image acquisition unit. The ventilation control unit adjusts a ventilation volume of the target space by a ventilation device that ventilates the target space, on the basis of the metabolic rate equivalent amount calculated by the first calculation unit.

Here, since the ventilation volume of the target space is adjusted on the basis of the metabolic rate equivalent amount of the person calculated on the basis of the captured image, the ventilation volume of the target space can be accurately approximated to an appropriate ventilation volume.

A ventilation device control apparatus of a second aspect is the ventilation device control apparatus of the first aspect, in which the first calculation unit determines, as an attribute of a person in the target space, at least one of age, gender, and a body type of the person in the target space, on the basis of the captured image acquired by the image acquisition unit. The first calculation unit calculates the metabolic rate equivalent amount on the basis of a determination result of the attribute.

Here, since the metabolic rate equivalent amount is calculated on the basis of an attribute of a person determined on the basis of the captured image, the metabolic rate equivalent amount of the person can be calculated accurately. Further, on the basis of the metabolic rate equivalent amount of the person, the ventilation volume of the target space can be accurately approximated to an appropriate ventilation volume.

A ventilation device control apparatus of a third aspect is the ventilation device control apparatus of the second aspect, in which the first calculation unit determines all of age, gender, and a body type of a person in the target space as an attribute of the person in the target space, and calculates the metabolic rate equivalent amount on the basis of a determination result of the attribute.

Here, since the metabolic rate equivalent amount is calculated on the basis of all of age, gender, and a body type of a person determined on the basis of the captured image, the metabolic rate equivalent amount of the person can be calculated accurately. Further, on the basis of the metabolic rate equivalent amount of the person, the ventilation volume of the target space can be accurately approximated to an appropriate ventilation volume.

A ventilation device control apparatus of a fourth aspect is any of the ventilation device control apparatuses of the first to third aspects, in which the first calculation unit determines an action during non-movement of a person in the target space on the basis of the captured image acquired by the image acquisition unit, and calculates the metabolic rate equivalent amount on the basis of a determination result of the action during non-movement.

Here, since the metabolic rate equivalent amount is calculated on the basis of an action of a person who is not moving, the metabolic rate equivalent amount of the person can be calculated accurately. On the basis of the metabolic rate equivalent amount of the person, the ventilation volume of the target space can be accurately approximated to an appropriate ventilation volume.

A ventilation device control apparatus of a fifth aspect is the ventilation device control apparatus of the fourth aspect, in which the first calculation unit determines an action of a seated person as an action during non-movement of a person in the target space on the basis of the captured image acquired by the image acquisition unit, and calculates the metabolic rate equivalent amount on the basis of a determination result of the action.

Here, the metabolic rate equivalent amount is calculated on the basis of an action of not only a person who is performing a vigorous action but also an action of a person who is sitting. Therefore, the metabolic rate equivalent amount of the person can be calculated accurately. On the basis of the metabolic rate equivalent amount of the person, the ventilation volume of the target space can be accurately approximated to an appropriate ventilation volume.

A ventilation device control apparatus of a sixth aspect is a ventilation device control apparatus of either the fourth aspect or the fifth aspect, in which the first calculation unit determines an action during movement of a person in the target space on the basis of the captured image acquired by the image acquisition unit, and calculates the metabolic rate equivalent amount on the basis of a determination result of the action during movement.

Here, since the metabolic rate equivalent amount is calculated also on the basis of an action during movement of a person, the metabolic rate equivalent amount of the person can be calculated accurately. On the basis of the metabolic rate equivalent amount of the person, the ventilation volume of the target space can be accurately approximated to an appropriate ventilation volume.

A ventilation device control apparatus of a seventh aspect is any of the ventilation device control apparatuses of the first to sixth aspects, in which, on the basis of the captured image acquired by the image acquisition unit, the first calculation unit determines at least one of a sweating amount and a heart rate of a person in the target space as a state amount of the person in the target space. The first calculation unit calculates the metabolic rate equivalent amount on the basis of a determination result of the state amount.

Here, since the metabolic rate equivalent amount is calculated on the basis of the sweating amount or the heart rate determined on the basis of the image, the metabolic rate equivalent amount of the person can be calculated accurately. On the basis of the metabolic rate equivalent amount of the person, the ventilation volume of the target space can be accurately approximated to an appropriate ventilation volume.

A ventilation device control apparatus of an eighth aspect is any of the ventilation device control apparatuses of the first to seventh aspects, in which the ventilation control unit adjusts the ventilation volume of the target space by the ventilation device, on the basis of a temporal change of the metabolic rate equivalent amount.

Here, instead of changing a ventilation volume after a carbon dioxide concentration rises or falls, it is possible to change the ventilation volume in anticipation of changes in the carbon dioxide concentration, while taking into account a trend of changes in the metabolic rate equivalent amount. Therefore, the ventilation volume of the target space can be accurately approximated to an appropriate ventilation volume.

A ventilation device control apparatus of a ninth aspect is any of the ventilation device control apparatus of the eighth aspect, in which, in a case where the metabolic rate equivalent amount is the same, the ventilation control unit adjusts the ventilation volume of the target space by the ventilation device to be larger when the metabolic rate equivalent amount has a tendency to increase, as compared to when the metabolic rate equivalent amount has a tendency to decrease.

Here, since the ventilation volume is adjusted to be large when the metabolic rate equivalent amount has a tendency to increase, it is possible to accurately suppress an excessive rise in the carbon dioxide concentration.

A ventilation device control apparatus of a tenth aspect is any of the ventilation device control apparatuses of the first to ninth aspects, and further includes a second calculation unit. The second calculation unit calculates a distance between a person in the target space and the ventilation device. The ventilation control unit adjusts the ventilation volume of the target space by the ventilation device further on the basis of the distance between the person in the target space and the ventilation device.

Here, since the ventilation volume of the target space is adjusted further on the basis of the distance between the person in the target space and the second calculation unit, it is possible to suppress a local rise in a carbon dioxide concentration around the person and suppress an occurrence of insufficient ventilation.

A ventilation system of an eleventh aspect includes an image capturing device that captures an image of the target space, a ventilation device that ventilates the target space, an image acquisition unit, a first calculation unit, and a ventilation control unit. The image acquisition unit acquires a captured image from the image capturing device. The first calculation unit calculates a metabolic rate equivalent amount of a person in the target space, on the basis of the captured image acquired by the image acquisition unit. The ventilation control unit adjusts a ventilation volume of the target space by the ventilation device, on the basis of the metabolic rate equivalent amount calculated by the first calculation unit.

Here, since the ventilation volume of the target space is adjusted on the basis of the metabolic rate equivalent amount of the person calculated on the basis of the captured image, the ventilation volume of the target space can be accurately approximated to an appropriate ventilation volume.

DETAILED DESCRIPTION OF EMBODIMENT(S)

An embodiment of a ventilation device control apparatus and a ventilation system having the ventilation device control apparatus will be described with reference to the drawings.

(1) Overall Configuration

Figure 1:
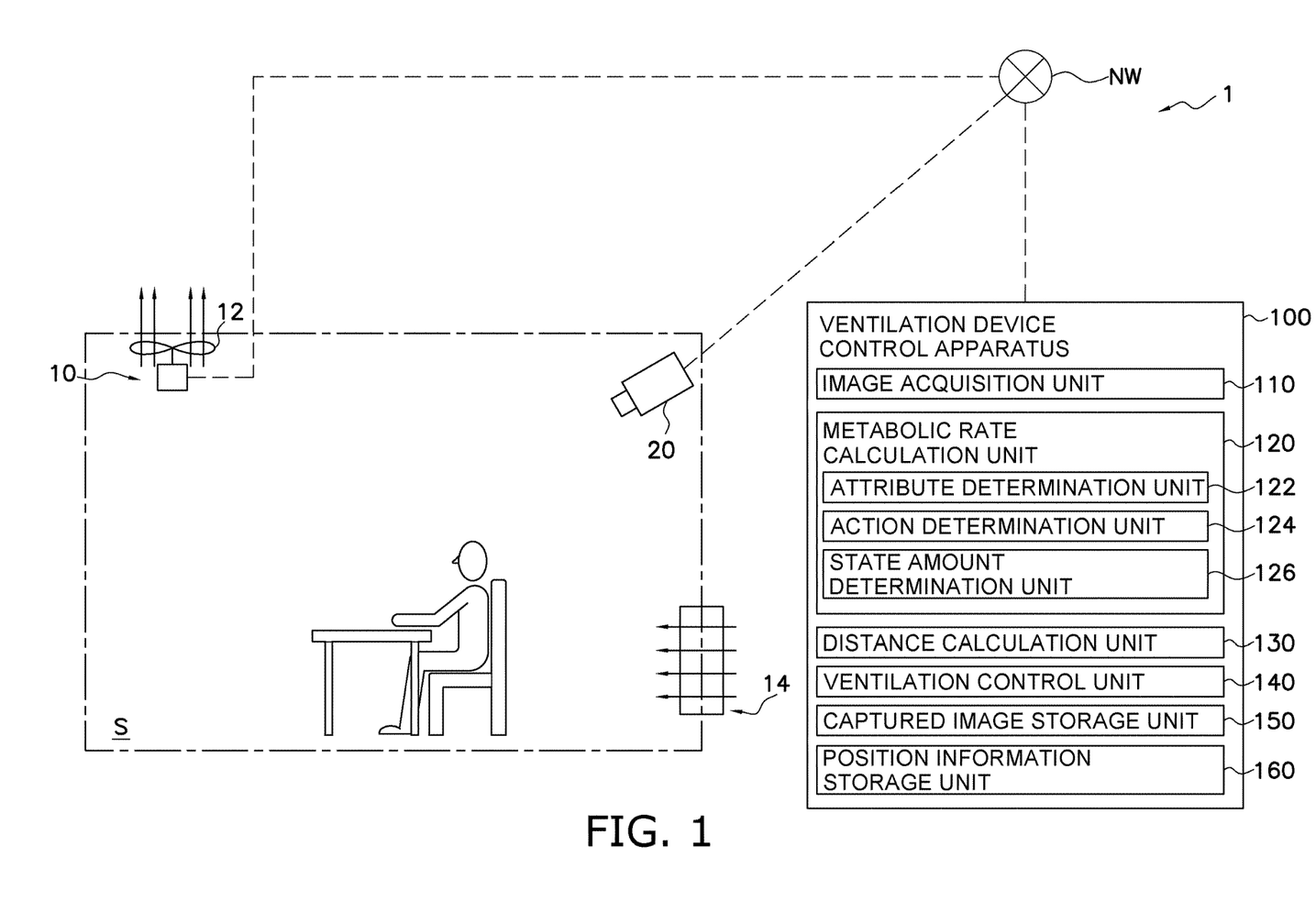
FIG. 1 is a schematic configuration diagram of a ventilation device control apparatus and a ventilation system including the ventilation device control apparatus, according to an embodiment.

An outline of a ventilation system 1 and a ventilation device control apparatus 100 included in the ventilation system 1 will be described with reference to FIG. 1. FIG. 1 is a schematic configuration diagram of the ventilation system 1.

The ventilation system 1 is a system that ventilates a target space S by exhausting air of the target space S from the target space S and taking in air from outside (outdoor) of the target space S, in order to keep an air environment in a room (the target space S) clean. The target space S is, for example, a house, an office, a store, a school, a fitness club, or the like. By using the ventilation system 1, for example, it is possible to suppress a rise in a carbon dioxide concentration in the target space S due to human activity.

Note that, from the viewpoint of keeping the air environment of the target space S clean, it is better to increase a ventilation volume (a ventilation volume per unit time) of the target space S as much as possible. However, in a case where the target space S is temperature-controlled by an air conditioner, when the ventilation volume of the target space S is increased, the temperature-adjusted air goes out from the target space S, which may change the temperature of the target space S in an unpleasant way. In addition, when the air conditioner responds to a temperature change of the target space S due to ventilation, energy consumed by the air conditioner will increase. Further, since the target space S is ventilated by a ventilation device 10 driven by a motor as described later, increasing the ventilation volume of the target space S leads to an increase in energy consumed by the ventilation device 10. Therefore, from the viewpoint of energy saving and the like, it is better to suppress the ventilation volume of the target space S.

Therefore, this ventilation system 1 adjusts the ventilation volume by the ventilation device 10 so as to reduce the ventilation volume as much as possible, while suppressing the carbon dioxide concentration from becoming excessive.

The ventilation system 1 includes at least one ventilation device 10, at least one image capturing device 20, and the ventilation device control apparatus 100. In summary, in the ventilation system 1, the ventilation device control apparatus 100 calculates a metabolic rate equivalent amount of a person in the target space S on the basis of a captured image taken by the image capturing device 20, and adjusts a ventilation volume of the target space S by the ventilation device 10 on the basis of the calculated metabolic rate equivalent amount. The metabolic rate equivalent amount of a person in the target space S is an amount that has a strong correlation with a carbon dioxide concentration in the target space S. A process executed by the ventilation device control apparatus 100 will be described later.

Here, the metabolic rate equivalent amount is an amount that correlates with an increase or a decrease in the metabolic rate. For example, the metabolic rate equivalent amount is an amount that increases or decreases as a metabolic rate increases or decreases. The metabolic rate is an energy consumption by a person per unit time, and is expressed in units such as "kilocalories/minute (kcal/min)".

The metabolic rate equivalent amount may be, for example, the metabolic rate itself. However, the metabolic rate equivalent amount need not be the metabolic rate (an energy consumption by a person per unit time) itself, but may be defined as a magnification of an energy consumption by a person per unit time with respect to a predetermined reference value. Further, the metabolic rate equivalent amount may not be a numerical value of the metabolic rate itself, but may be, for example, a level indicating a degree of the metabolic rate stepwise. For example, in one example, the level at which a degree of the metabolic rate is expressed stepwise is represented by, for example, ten steps from 1 to 10, and the level is expressed by a larger value as the metabolic rate becomes larger. In addition, the metabolic rate equivalent amount may be physical activity intensity or exercise intensity that correlates with the metabolic rate. For example, the metabolic rate equivalent amount may be an energy metabolic rate (a relative metabolic rate) or a metabolic equivalent (MET) that indicates physical activity intensity. In general, in the same person, the metabolic rate becomes larger as a value of physical activity intensity is larger.

Note that, in the embodiment, a description is mainly given to a case where the calculated metabolic rate equivalent amount is the metabolic rate itself, as an example.

(2) Detailed Configuration

The ventilation device 10, the image capturing device 20, and the ventilation device control apparatus 100 of the ventilation system 1 will be described below.

(2-1) Ventilation Device

The ventilation device 10 is a device that ventilates the target space S.

For example, in the embodiment, the ventilation device 10 is a device that exhausts air in the target space S to outside of the target space S by using a fan 12. The ventilation device 10 may be a device that directly exhausts air in the target space S to outside, or may be a device that indirectly exhausts air in the target space S (for example, to a duct or the like that connects to outdoors). By a configuration of causing outdoor air to be taken into the target space S by natural air supply from an air supply port 14 that directly or indirectly communicates with the outside while using such a ventilation device 10 on the exhaust side to exhaust air in the target space S, ventilation of the target space S is realized.

Note that, in another mode, the ventilation device may be a device that supplies outdoor air to the target space S by using a fan (not shown). The ventilation device may be a device that directly supplies outdoor air to the target space S, or may be a device that indirectly supplies outdoor air to the target space S (for example, through a duct or the like). Ventilation of the target space S may be realized by naturally exhausting air in the target space S from an exhaust port (not illustrated) that communicates with a space outside the target space S, while using such a ventilation device on the air supply side to supply outdoor air to the target space S. Further, in still another mode, the ventilation device 10 may include both a fan that exhausts air in the target space S and a fan that supplies outdoor air to the target space S.

In the embodiment, the ventilation device 10 has, for example, the fan 12 having a constant air volume and driven by a constant speed motor. When the ventilation device 10 has the fan 12 having a constant air volume, a ventilation volume (a ventilation volume per unit time) of the ventilation device 10 can be changed, for example, by changing a ratio of an operating time of the fan 12 per unit time. Further, the ventilation device 10 may have an electric air volume adjusting damper (not illustrated), and the ventilation volume of the target space S may be changed by the air volume adjusting damper. Further, the ventilation device 10 may have a fan having a variable air volume and driven by a variable speed motor, instead of the fan having a constant air volume and driven by the constant speed motor.

In the ventilation system 1, a ventilation volume of the target space S by the ventilation device 10 is adjusted by the ventilation device control apparatus 100 in a manner as described later. Meanwhile, it is also possible to control an operation and a stop and the like of the ventilation device 10 on the basis of manual operation or a set schedule. However, a description of operation control of the ventilation device 10 based on a manual operation and a set schedule will be omitted here.

(2-2) Image Capturing Device

The image capturing device 20 is a camera provided in the target space S. The number of image capturing devices 20 may be one or plural. The image capturing device 20 is preferably a camera that captures a moving image. Specifications (performance) of the camera may be determined in accordance with an image resolution and the like required for the ventilation device control apparatus 100 to determine an attribute, an action, and a state amount of a person as described later.

The image capturing device 20 is attached on, for example, a ceiling or a wall surface of the target space S. However, the image capturing device 20 need not be attached on the ceiling or the wall surface, but may be placed on furniture (for example, a desk or a shelf) installed in the target space S, or may be attached to a device installed in the target space S (for example, the ventilation device 10, an air conditioner, or the like). It is preferable that the image capturing device 20 is installed at a position where it is possible to capture an image of a person in the target space S with a small number of devices.

The image capturing device 20 may be a dedicated camera used to provide a captured image to the ventilation device control apparatus 100. Further, the image capturing device 20 may be a camera also used for the purpose of crime prevention and control of devices other than the ventilation device 10. Furthermore, the image capturing device 20 may be a camera attached to a mobile terminal such as a mobile phone that is installed so as to image the target space S.

(2-3) Ventilation Device Control Apparatus

The ventilation device control apparatus 100 is a device configured to control the ventilation device 10 installed in the target space S.

The ventilation device control apparatus 100 is, for example, a server installed in a data center or the like. A function as the ventilation device control apparatus 100 may be realized by one server or may be realized by a plurality of servers. Further, the ventilation device control apparatus 100 may include a computer installed in the target space S, and a part or all of processing necessary for the function as the ventilation device control apparatus 100 may be performed by the computer installed in the target space S. Here, a case where the function as the ventilation device control apparatus 100 is realized by one server will be described as an example.

The ventilation device control apparatus 100 is communicably connected by a network NW to the ventilation device 10 and the image capturing device 20 installed in the target space S. The network NW here is the Internet, but may be another WAN or a LAN.

Note that, here, the ventilation device control apparatus 100 will be described as a device to control the ventilation device 10 installed in a single target space S. However, the ventilation device control apparatus 100 may be configured to be connected to ventilation devices and image capturing devices installed in a plurality of target spaces (not shown), and to control an operation of the ventilation devices installed in the plurality of target spaces.

The ventilation device control apparatus 100 includes a control arithmetic device, a storage device, an input device, an output device, a communication control device, and the like. As the control arithmetic device, a processor such as a CPU can be used. The control arithmetic device reads a program stored in the storage device and performs predetermined arithmetic processing in accordance with the program. Further, the control arithmetic device can write an arithmetic result to the storage device and read information stored in the storage device in accordance with the program.

Figure 2:
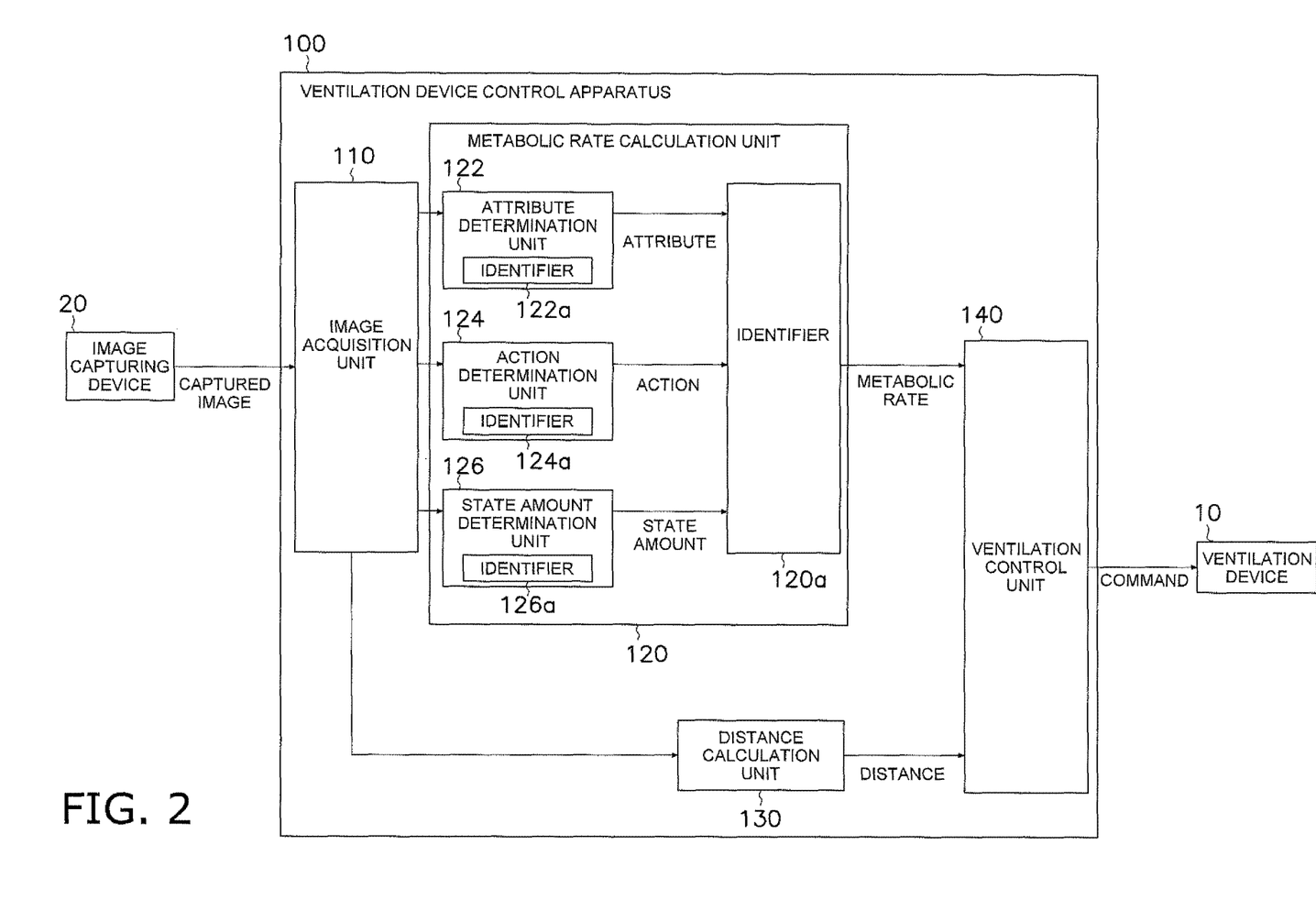
FIG. 2 is a functional block diagram of the ventilation system of FIG. 1.

The ventilation device control apparatus 100 mainly has, as functional units, an image acquisition unit 110, a metabolic rate calculation unit 120, a distance calculation unit 130, a ventilation control unit 140, a captured image storage unit 150, and a position information storage unit 160. The position information storage unit 160 stores position information of the ventilation device 10 and the image capturing device 20 inputted to the ventilation device control apparatus 100.

(2-3-1) Image Acquisition Unit

The image acquisition unit 110 acquires a captured image transmitted via the network NW from the image capturing device 20 that captures the target space S. For example, from the image capturing device 20, captured images for a predetermined time are periodically transmitted. Instead of this, captured images may be continuously transmitted from the image capturing device 20. The image acquisition unit 110 stores the acquired captured images in the captured image storage unit 150.

(2-3-2) Metabolic Rate Calculation Unit

The metabolic rate calculation unit 120 is an example of a first calculation unit. The metabolic rate calculation unit 120 is a functional unit that calculates a metabolic rate equivalent amount of a person in the target space S on the basis of a captured image acquired by the image acquisition unit 110. In particular, here, the metabolic rate calculation unit 120 calculates a metabolic rate of a person in the target space S on the basis of a captured image acquired by the image acquisition unit 110. The metabolic rate calculation unit 120 has an attribute determination unit 122, an action determination unit 124, and a state amount determination unit 126, as sub-function units.

The metabolic rate calculation unit 120 generally performs processing as follows. First, the attribute determination unit 122, the action determination unit 124, and the state amount determination unit 126 of the metabolic rate calculation unit 120 determine an attribute, an action, and a state amount of a person in a captured image, in other words, a person in the target space S, on the basis of the captured image acquired by the image acquisition unit 110 (a captured image stored in the captured image storage unit 150). Further, the metabolic rate calculation unit 120 calculates a metabolic rate on the basis of a determination result of the attribute, the action, and the state amount of the person in the target space S. The calculated metabolic rate may be calculated as a value, or may be a range of numerical values. Further, in another mode, the metabolic rate may be calculated as a degree of magnitude of the metabolic rate (for example, "very high", "high", "low", and the like) rather than as a numerical value.

It is preferable that the attribute of the person in the target space S determined by the attribute determination unit 122 on the basis of the captured image includes at least one of age, gender, and a body type. Particularly preferably, the attribute determination unit 122 determines all of age, gender, and a body type of the person in the target space S as the attribute of the person in the target space S. The age here may be a fine number such as "42 years old" or a range of ages such as "40s".

It is preferable that the action of the person in the target space S determined by the action determination unit 124 on the basis of the captured image includes an action during non-movement of the person in the target space S. Further, it is preferable that the action of the person in the target space S determined by the action determination unit 124 on the basis of the captured image includes an action during movement of the person in the target space S. "During movement" means a time when a person is moving in a predetermined distance (for example, 3 m) or more in a horizontal direction within a predetermined time (for example, 5 seconds). Whereas, "during non-movement" means a time when a moving distance of a person in the horizontal direction for a predetermined time is less than the predetermined distance. For example, when the target space S is a fitness club, the action during non-movement of a person includes an action of a person exercising using a treadmill and an action of a person performing muscle training. Further, for example, when the target space S is a residential room, the action during non-movement of a person includes an action of a person during work such as cooking and ironing. Further, for example, when the target space S is an office room, the action during non-movement of a person includes an action of a seated person (for example, input work and the like on a computer) and an action of a person performing work such as copying.

The state amount of the person in the target space S determined by the state amount determination unit 126 on the basis of the captured image preferably includes at least one of a sweating amount and a heart rate of the person in the target space S. Particularly preferably, the state amount determination unit 126 determines both a sweating amount and a heart rate of the person in the target space S as the state amount of the person in the target space S. The sweating amount is calculated as, for example, a degree corresponding to the sweating amount (for example, "a large sweating amount", "a slightly large sweating amount", "no sweating", and the like). However, the sweating amount may be calculated as a numerical value. Further, the heart rate is calculated as a value of the heart rate, for example, but may be calculated as a degree corresponding to the heart rate.

The metabolic rate calculation unit 120 has an identifier 120a having learned through machine learning. The identifier 120a is configured to output a metabolic rate according to inputs of determination results of the attribute determination unit 122, the action determination unit 124, and the state amount determination unit 126 (determination results of an attribute, an action, and a state amount of the person in the target space S). The identifier 120a has already learned through, for example, supervised learning. The machine learning means a technology and a method, which are not rule-based and in which a computer learns about given information and autonomously finds rules for determination (even when rules and the like for determination are not given to the computer in advance). Further, the supervised leaning means a machine learning method that causes the identifier 120a to learn, by providing data (training data) in which an input (here, determination results of an attribute, an action, and a state amount of a person in the target space S) and a correct answer (a metabolic rate equivalent amount, especially here, a metabolic rate) of an output corresponding the input are associated.

For example, the identifier 120a during learning is provided with, as training data, a large number of data in which "an attribute, an action, and a state amount" and "an actual metabolic rate of a person having the attribute and the state amount and performing the action" are associated. For example, the identifier 120a during learning is provided with, as one piece of training data, data in which "an attribute, an action, and a state amount" such as "male, 42 years old, medium build, sitting in office work, no sweating, heart rate 65" and "an actual metabolic rate of the person having the attribute and the state amount and performing the action" are associated.

Here, an algorithm used by the identifier 120a is, for example, a neural network (including deep learning). However, the learning algorithm used by the identifier 120a may be another machine learning algorithm (for example, regression analysis). The algorithm used by the identifier 120a may be appropriately selected.

The attribute determination unit 122 has a learned identifier 122a that determines age, gender, and a body type of a person on the basis of an image of the person. In other words, the attribute determination unit 122 has the learned identifier 122a that uses an image of a person as an input and outputs age, gender, and a body type of the person. The attribute determination unit 122 may have individual identifiers in order to determine age, gender, and a body type individually. Here, the identifier 122a to determine age, gender, and a body type of a person on the basis of an image of the person will be described as an example.

The identifier 122a has already learned through, for example, supervised learning. For example, the identifier 122a during learning is provided with, as training data, a large amount of data in which full-body images (input) of people of different gender, age, and body types, with actual attributes (output) of people shown in the image are associated.

Meanwhile, when the attribute determination unit 122 has individual identifiers in order to determine age, gender, and a body type individually, the identifiers may use different types of images as the input. For example, an identifier that determines age uses an image of a person's face as an input, and an identifier that determines gender and a body type uses a full-body image of a person as an input.

Here, an algorithm used by the identifier 122a is, for example, deep learning. When deep learning is used as the algorithm, the identifier 120a automatically acquires and learns features of an image without design of a feature amount by a person. However, the learning algorithm used by the identifier 122a may be another machine learning algorithm (for example, support vector machine (SVM) or the like). A person, instead of the identifier 120a, may extract a feature amount in images (features on which attention should be focused for deriving an output from an input).

The action determination unit 124 has a learned identifier 124a that determines an action of a person on the basis of an image of the person. In other words, the action determination unit 124 has the learned identifier 124a that uses an image of a person as an input and outputs an action of the person.

The identifier 124a has already learned through, for example, supervised learning. For example, the identifier 124a during learning is provided with, as training data, a large amount of data in which full-body images (input) of people performing various actions and actual movement contents (output) of people shown in the image are associated. As the training data, it is preferable to provide both training data of an image of a person during movement and training data of an image of a person during non-movement. In other words, it is preferable that the identifier 124a performs learning, for an image of a person, such that both an action during movement of a person and an action during non-movement can be determined.

Here, an algorithm used by the identifier 124a is, for example, deep learning. However, the learning algorithm used by the identifier 124a may be another machine learning algorithm (for example, support vector machine (SVM) or the like). A person, instead of the identifier 124a, may extract a feature amount in images.

The state amount determination unit 126 has a learned identifier 126a that determines a sweating amount and a heart rate of a person on the basis of an image of the person. In other words, the state amount determination unit 126 has the learned identifier 126a that uses an image of a person as an input and outputs a sweating amount and a heart rate of the person. The state amount determination unit 126 may have individual identifiers in order to determine a sweating amount and a heart rate individually. Here, the identifier 126a to determine a sweating amount and a heart rate of a person on the basis of an image of the person will be described as an example.

The identifier 126a has already learned through, for example, supervised learning. For example, the identifier 126a during learning is provided with, as training data, a large amount of data in which full-body images (input) of people with different sweating amounts and heart rates and actual sweating amounts and heart rates (output) of people shown in the image are associated. When the state amount determination unit 126 has individual identifiers in order to determine a sweating amount and a heart rate individually, the identifiers may use, different types of images as the input.

Here, an algorithm used by the identifier 126a is, for example, deep learning. However, the learning algorithm used by the identifier 126a may be another machine learning algorithm (for example, support vector machine (SVM) or the like). A person, instead of the identifier 126a, may extract a feature amount in an image (features on which attention should be focused for deriving an output from an input, for example, such as a skin color and light reflectance).

(2-3-3) Distance Calculation Unit

The distance calculation unit 130 is an example of a second calculation unit. The distance calculation unit 130 is a functional unit that calculates a distance between a person in the target space S and the ventilation device 10.

For example, the distance calculation unit 130 calculates a distance from the image capturing device 20 to a person, from a captured image of one image capturing device 20 by using an image processing technique. Then, on the basis of: the calculated distance; a direction of the person with respect to the image capturing device 20 obtained from the captured image of the image capturing device 20; and position information of the ventilation device 10 and the image capturing device 20 stored in the position information storage unit 160, the distance calculation unit 130 calculates a distance between a person in the target space S (a person captured by the image capturing device 20) and the ventilation device 10.

However, a method of calculating the distance from the image capturing device 20 to a person is not limited to the above method. For example, the distance from the image capturing device 20 to a person may be calculated by obtaining a position of the person in the manner of triangulation using captured images of two or more image capturing devices 20. Further, the distance from the image capturing device 20 to a person may be calculated by using a stereo camera as the image capturing device 20. Further, the distance from the image capturing device 20 to a person may be calculated by using various distance sensors (an infrared depth sensor, an ultrasonic sensor, and the like) provided near the image capturing device 20.

When the image capturing device 20 is installed near the ventilation device 10, the distance calculation unit 130 may calculate the distance as the distance between the person in the target space S (the person captured by the image capturing device 20) and the ventilation device 10. In this case, the position information storage unit 160 that stores the position information of the ventilation device 10 and the image capturing device 20 may not be provided.

(2-3-4) Ventilation Control Unit

The ventilation control unit 140 adjusts a ventilation volume of the target space S by the ventilation device 10 that ventilates the target space S, on the basis of the metabolic rate calculated by the metabolic rate calculation unit 120. Specifically, the ventilation control unit 140 determines the ventilation volume of the target space S by the ventilation device 10 that ventilates the target space S, on the basis of the metabolic rate calculated by the metabolic rate calculation unit 120, and transmits a command to the ventilation device 10 (for example, a start or stop command or an air volume adjustment command for the ventilation device 10) for realizing the ventilation volume. A method of determining the ventilation volume of the target space S by the ventilation control unit 140 will be described later.

(3) Operation of Ventilation System

An operation of the ventilation system 1 will be described with reference to a functional block diagram of FIG. 2. Note that, here, it is assumed that there is a person in the target space S.

The image capturing device 20 captures an image of the target space S. The image may be captured constantly or intermittently. The captured image captured by the image capturing device 20 is transmitted to the ventilation device control apparatus 100 via the network NW, and is acquired by the image acquisition unit 110.

The metabolic rate calculation unit 120 calculates a metabolic rate of a person in the target space S on the basis of the captured image acquired by the image acquisition unit 110 as described below. The metabolic rate calculation unit 120 calculates the metabolic rate, for example, at predetermined time intervals.

First, the metabolic rate calculation unit 120 performs preprocessing on the captured image acquired by the image acquisition unit 110, if necessary. The preprocessing includes processing such as, for example, extracting only a human area and a face area from the captured image, and resizing when a size of a human image is different from a size of a human image in the training data.

The attribute determination unit 122 of the metabolic rate calculation unit 120 uses the learned identifier 122a to determine age, gender, and a body type of a person shown in the captured image (a person in the target space S) as an attribute of the person in the target space, on the basis of the captured image after the preprocessing.

The action determination unit 124 of the metabolic rate calculation unit 120 uses the learned identifier 124a, to determine an action during movement and an action during non-movement of a person shown in the captured image (a person in the target space S), on the basis of the captured image after the preprocessing. For example, the action during non-movement of the person in the target space S includes determination of an action of a seated person. The action determination unit 124 of the metabolic rate calculation unit 120 may only determine, for example, as being in non-movement instead of determining an action during non-movement. However, even during non-movement, for example, a person exercising using a treadmill and a person sitting and relaxing have different metabolic rates. Therefore, it is preferable that the action determination unit 124 of the metabolic rate calculation unit 120 also determines an action during non-movement.

The state amount determination unit 126 of the metabolic rate calculation unit 120 uses the learned identifier 126a, to determine a sweating amount and a heart rate of a person shown in the captured image (a person in the target space S) as a state amount of the person in the target space S, on the basis of the captured image after the preprocessing.

When the attribute determination unit 122, the action determination unit 124, and the state amount determination unit 126 receive the captured image acquired by the image acquisition unit 110 as an input, and output an attribute, an action, and a state amount of the person in the target space S, the metabolic rate calculation unit 120 inputs these determination results to the identifier 120a to calculate the metabolic rate of the person in the target space S.

The captured image acquired by the image acquisition unit 110 is also provided to the distance calculation unit 130. The distance calculation unit 130 calculates a distance between a person in the target space S and the ventilation device 10 (a description of a calculation method is omitted), on the basis of the captured image acquired by the image acquisition unit 110.

Next, the ventilation control unit 140 adjusts the ventilation volume of the target space S by the ventilation device 10 that ventilates the target space S, on the basis of the metabolic rate calculated by the metabolic rate calculation unit 120. Preferably, the ventilation control unit 140 adjusts the ventilation volume of the target space S by the ventilation device 10 that ventilates the target space S, further on the basis of the distance between the person in the target space S and the ventilation device 10 calculated by the distance calculation unit 130, in addition to the metabolic rate calculated by the metabolic rate calculation unit 120. Specifically, the ventilation control unit 140 determines the ventilation volume of the target space S by the ventilation device 10 that ventilates the target space S on the basis of the metabolic rate calculated by the metabolic rate calculation unit 120, and transmits a command to the ventilation device 10 to realize the ventilation volume. A method of determining the ventilation volume of the target space S by the ventilation control unit 140 will be described later.

Note that, here, a case where there is one person in the target space S has been described as an example, but the ventilation system 1 can handle a case where there are a plurality of people in the target space S as follows.

When there are a plurality of people in the target space S, the metabolic rate calculation unit 120 of the ventilation device control apparatus 100 calculates a metabolic rate of each of the plurality of people in the target space S. Then, the ventilation control unit 140 of the ventilation device control apparatus 100 determines a ventilation volume corresponding to the metabolic rate of each person on the basis of the metabolic rate of each person calculated by the metabolic rate calculation unit 120. Then, the ventilation control unit 140 of the ventilation device control apparatus 100 controls the ventilation device 10 such that the ventilation device 10 in the target space S ventilates a ventilation volume (a total ventilation volume) obtained by adding the determined ventilation volumes.

(4) Ventilation Volume Determination Process by Ventilation Control Unit

Figure 3:
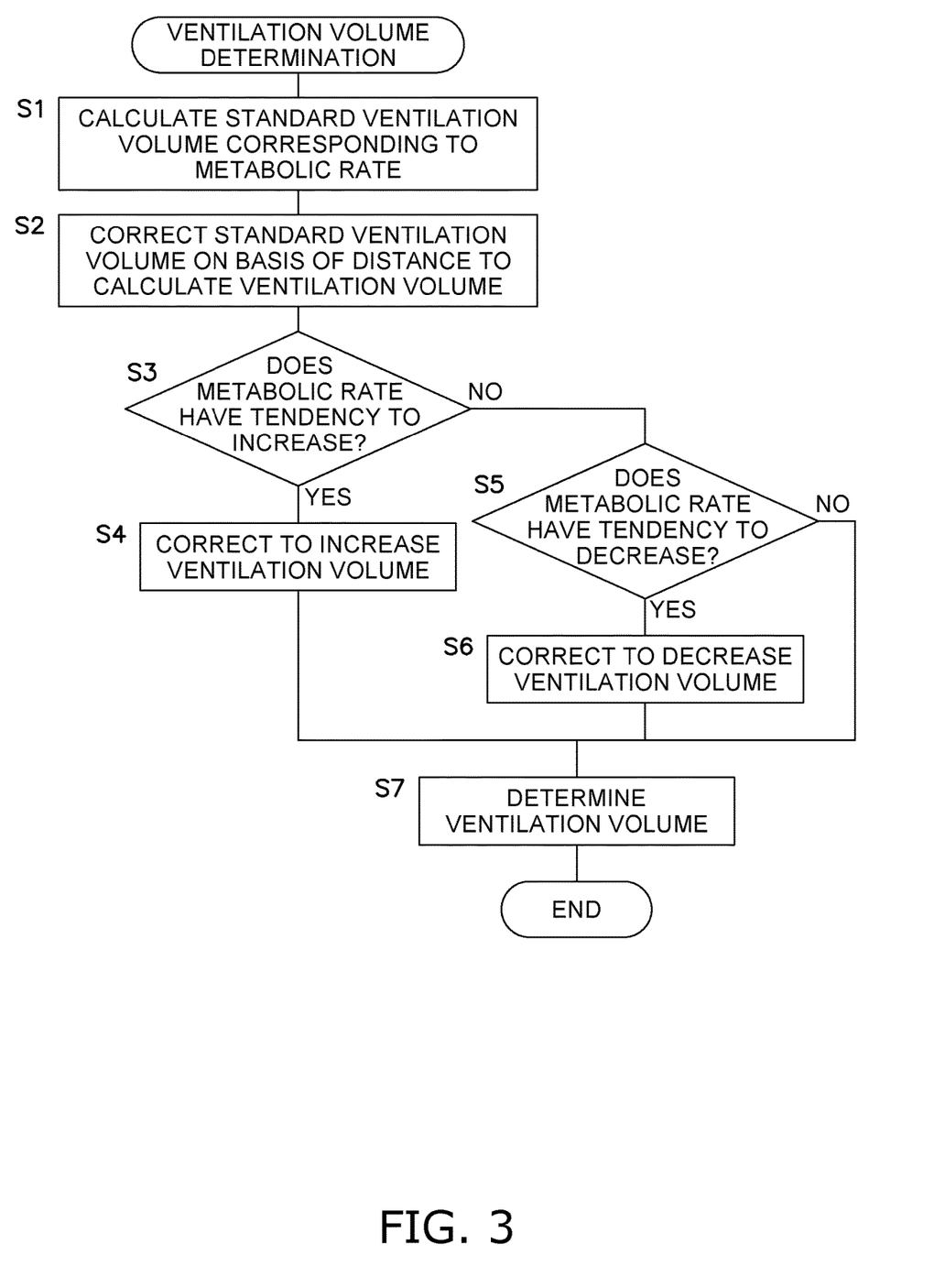
FIG. 3 is a flowchart of a ventilation volume determination process of the ventilation device control apparatus of FIG. 1.

A process executed by the ventilation control unit 140, particularly a process of determining the ventilation volume, will be described with reference to a flowchart of FIG. 3.

First, when the metabolic rate calculation unit 120 calculates the metabolic rate, the ventilation control unit 140 refers to a mathematical formula or a table that describe a correlation between metabolic rates and ventilation volumes as a standard (called as standard ventilation volumes), which are stored in advance in a storage device (not shown), to derive a standard ventilation volume corresponding to the metabolic rate calculated by the metabolic rate calculation unit 120 (step S1).

Next, the ventilation control unit 140 calculates the ventilation volume of the target space S by the ventilation device 10 on the basis of a distance between the person in the target space S and the ventilation device 10 calculated by the distance calculation unit 130 (step S2). Specifically, the ventilation control unit 140 calculates the ventilation volume by correcting the standard ventilation volume calculated in step S1 on the basis of the distance between the person in the target space S and the ventilation device 10. For example, when the distance between the person in the target space S and the ventilation device 10 is a predetermined distance or more, the ventilation control unit 140 increases the ventilation volume to be higher than the standard ventilation volume (for example, adds a predetermined correction ventilation volume to the standard ventilation volume to calculate the ventilation volume). For example, the ventilation control unit 140 calculates the ventilation volume by multiplying the standard ventilation volume by a correction coefficient that increases as the distance between the person in the target space S and the ventilation device 10 increases. By determining the ventilation volume in consideration of the distance between the person in the target space S and the ventilation device 10 in this way, it is possible to suppress an event in which the ventilation device 10 does not provide sufficient ventilation (air stagnates) around the person since the person is at a position away from the ventilation device 10, and a carbon dioxide concentration becomes locally high. Note that the correction based on the distance need not be performed all the time, and may be performed only when the standard ventilation volume calculated in step S1 is higher than a predetermined value (only when a carbon dioxide concentration tends to rise around the person).

Next, in step S3, the ventilation control unit 140 compares the metabolic rate (a current metabolic rate) used to calculate the standard ventilation volume in step S1 with the metabolic rate (a previous metabolic rate) used in step S1 when the ventilation control unit 140 determines the ventilation volume at a previous time, to determine whether the metabolic rate has a tendency to increase. For example, the ventilation control unit 140 determines whether or not the metabolic rate (the current metabolic rate) used to calculate the standard ventilation volume in step S1 is larger than the metabolic rate (the previous metabolic rate) used in step S1 when the ventilation control unit 140 determines the ventilation volume at a previous time, by a predetermined value $\alpha$ ($\alpha>0$) or more.

Then, when the metabolic rate has a tendency to increase, the ventilation control unit 140 makes correction to increase the ventilation volume calculated in step S2 (increase the ventilation volume by a predetermined amount, multiply the ventilation volume by a correction coefficient greater than 1, or the like) (step S4), and the process proceeds to step S7. When the metabolic rate has no tendency to increase, the process proceeds to step S5.

In step S5, the ventilation control unit 140 compares the metabolic rate (the current metabolic rate) used to calculate the standard ventilation volume in step S1 with the metabolic rate (the previous metabolic rate) used in step S1 when the ventilation control unit 140 determines the ventilation volume at a previous time, to determine whether the metabolic rate has a tendency to decrease. For example, the ventilation control unit 140 determines whether or not the metabolic rate (the current metabolic rate) used to calculate the standard ventilation volume in step S1 is smaller than the metabolic rate (the previous metabolic rate) used in step S1 when the ventilation control unit 140 determines the ventilation volume at a previous time, by a predetermined value $\beta$ ($\beta>0$) or more.

Then, when the metabolic rate has a tendency to decrease, the ventilation control unit 140 makes correction to decrease the ventilation volume calculated in step S2 (decrease the ventilation volume by a predetermined amount, multiply the ventilation volume by a correction coefficient smaller than 1, or the like) (step S6), and the process proceed to step S7. When it is determined in step S5 that the metabolic rate has no tendency to decrease, the process proceeds to step S7.

In step S7, the calculated ventilation volume is determined as the ventilation volume.

Note that, the processes of steps S3 to S6 are processes executed by the ventilation control unit 140 to adjust the ventilation volume of the target space S by the ventilation device 10 on the basis of a temporal change of the metabolic rate. In this process, in a case where the metabolic rate used to calculate the standard ventilation volume is the same, the ventilation control unit adjusts the ventilation volume of the target space S by the ventilation device 10 to be larger when the metabolic rate has a tendency to increase, as compared to when the metabolic rate has a tendency to decrease.

When a change in metabolic rate has a rising or falling tendency, the tendency often continues for a predetermined period of time. Here, by adjusting the ventilation volume of the target space S by the ventilation device 10 on the basis of a temporal change of the metabolic rate, it is possible to change the ventilation volume in anticipation of changes in a carbon dioxide concentration instead of changing the ventilation volume after the carbon dioxide concentration rises or falls. Therefore, the ventilation volume of the target space S can be accurately approximated to an appropriate ventilation volume.

(5) Characteristics (5-1)

The ventilation device control apparatus 100 of the above embodiment includes the image acquisition unit 110, the metabolic rate calculation unit 120, and the ventilation control unit 140. The image acquisition unit 110 acquires a captured image from the image capturing device 20 that captures an image of the target space S. The metabolic rate calculation unit 120 calculates a metabolic rate equivalent amount of a person in the target space S on the basis of the captured image acquired by the image acquisition unit 110. In particular, here, the metabolic rate calculation unit 120 calculates a metabolic rate of a person in the target space S on the basis of the captured image acquired by the image acquisition unit 110. The ventilation control unit 140 adjusts a ventilation volume of the target space S by the ventilation device 10 that ventilates the target space S, on the basis of a metabolic rate calculated by the metabolic rate calculation unit 120.

Here, since the ventilation volume of the target space S is adjusted on the basis of the metabolic rate of the person calculated on the basis of the captured image, the ventilation volume of the target space S can be accurately approximated to an appropriate ventilation volume. By optimizing the ventilation volume of the target space S, it is possible to suppress an increase in power of the ventilation device 10 and an air conditioning load of the target space S, while ensuring a necessary ventilation volume.

Meanwhile, in the embodiment, the ventilation volume of the target space S is adjusted on the basis of the metabolic rate itself, but instead, the ventilation volume of the target space S may be adjusted on the basis of a metabolic rate equivalent amount.

(5-2)

In the ventilation device control apparatus 100 of the above embodiment, on the basis of the captured image acquired by the image acquisition unit 110, the metabolic rate calculation unit 120 determines at least one of age, gender, or a body type of a person in the target space S, as an attribute of the person in the target space S. The metabolic rate calculation unit 120 calculates the metabolic rate on the basis of a determination result of the attribute.

Particularly preferably, the metabolic rate calculation unit 120 determines all of age, gender, and the body type of the person in the target space S as the attribute of the person in the target space S, and calculates the metabolic rate on the basis of a determination result of the attribute.

Here, since the metabolic rate is calculated on the basis of the attribute of the person determined on the basis of the captured image, the metabolic rate of the person can be calculated accurately. Further, on the basis of the metabolic rate of the person, the ventilation volume of the target space S can be accurately approximated to an appropriate ventilation volume.

(5-3)

In the ventilation device control apparatus 100 of the above embodiment, the metabolic rate calculation unit 120 determines an action during non-movement of a person in the target space S on the basis of the captured image acquired by the image acquisition unit 110, and calculates the metabolic rate on the basis of a determination result of the action during non-movement.

Here, since the metabolic rate is calculated on the basis of an action of a person who is not moving, the metabolic rate of the person can be calculated accurately. On the basis of the metabolic rate of the person, the ventilation volume of the target space S can be accurately approximated to an appropriate ventilation volume.

(5-4)

In the ventilation device control apparatus 100 of the above embodiment, on the basis of the captured image acquired by the image acquisition unit 110, the metabolic rate calculation unit 120 determines an action of a seated person as an action during non-movement of a person in the target space S, and calculates the metabolic rate on the basis of a determination result of the action.

Here, since the metabolic rate is calculated further on the basis of an action of a person who is sitting, the metabolic rate of the person can be calculated accurately. On the basis of the metabolic rate of the person, the ventilation volume of the target space S can be accurately approximated to an appropriate ventilation volume.

(5-5)

In the ventilation device control apparatus 100 of the above embodiment, the metabolic rate calculation unit 120 determines an action during movement of a person in the target space S on the basis of the captured image acquired by the image acquisition unit 110, and calculates the metabolic rate on the basis of a determination result of the action during movement.

Here, since the metabolic rate is calculated also on the basis of the action during movement of the person, the metabolic rate of the person can be calculated accurately. On the basis of the metabolic rate of the person, the ventilation volume of the target space S can be accurately approximated to an appropriate ventilation volume.

(5-6)

In the ventilation device control apparatus 100 of the above embodiment, the metabolic rate calculation unit 120 determines at least one of a sweating amount or a heart rate of a person in the target space S as a state amount of the person in the target space S on the basis of the captured image acquired by the image acquisition unit 110. The metabolic rate calculation unit 120 calculates the metabolic rate on the basis of a determination result of the state amount.

Here, since the metabolic rate is calculated on the basis of the sweating amount or the heart rate determined on the basis of the image, the metabolic rate of the person can be calculated accurately. On the basis of the metabolic rate of the person, the ventilation volume of the target space S can be accurately approximated to an appropriate ventilation volume.

(5-7)

In the ventilation device control apparatus 100 of the above embodiment, the ventilation control unit 140 adjusts the ventilation volume of the target space S by the ventilation device 10 on the basis of a temporal change of the metabolic rate.

Here, instead of changing the ventilation volume after a carbon dioxide concentration rises or falls, it is possible to change the ventilation volume in anticipation of changes in the carbon dioxide concentration, while taking into account a trend of changes in the metabolic rate. Therefore, the ventilation volume of the target space S can be accurately approximated to an appropriate ventilation volume.

Preferably, in the ventilation device control apparatus 100 of the above embodiment, in a case where the metabolic rate is the same, the ventilation control unit 140 adjusts the ventilation volume of the target space S by the ventilation device 10 to be larger when the metabolic rate has a tendency to increase, as compared to when the metabolic rate has a tendency to decrease.

When a change in metabolic rate has a rising or falling tendency, the tendency often continues for a predetermined period of time. Here, since the ventilation volume is adjusted to be large when the metabolic rate has a tendency to increase, it is possible to accurately suppress an excessive rise in the carbon dioxide concentration.

(5-8)

The ventilation device control apparatus 100 of the above embodiment includes the distance calculation unit 130. The distance calculation unit 130 calculates a distance between a person in the target space S and the ventilation device 10. The ventilation control unit 140 adjusts the ventilation volume of the target space S by the ventilation device 10 on the basis of the distance between the person in the target space S and the ventilation device 10.

Here, since the ventilation volume of the target space S is adjusted on the basis of the distance between the person in the target space S and the distance calculation unit 130, it is possible to suppress a local rise in a carbon dioxide concentration around the person and suppress an occurrence of insufficient ventilation.

(5-9)

The ventilation system 1 of the above embodiment includes the image capturing device 20 that captures an image of the target space S, the ventilation device 10 that ventilates the target space S, the image acquisition unit 110, the metabolic rate calculation unit 120, and the ventilation control unit 140. The image acquisition unit 110 acquires a captured image from the image capturing device 20. The metabolic rate calculation unit 120 calculates a metabolic rate of a person in the target space S, on the basis of the captured image acquired by the image acquisition unit 110. The ventilation control unit 140 adjusts a ventilation volume of the target space S by the ventilation device 10, on the basis of the metabolic rate calculated by the metabolic rate calculation unit 120.

Here, since the ventilation volume of the target space S is adjusted on the basis of the metabolic rate of the person calculated on the basis of the captured image, the ventilation volume of the target space S can be accurately approximated to an appropriate ventilation volume. By optimizing the ventilation volume of the target space S, it is possible to suppress an increase in power of the ventilation device 10 and an air conditioning load of the target space S, while ensuring a necessary ventilation volume.

(6) Modification Example (6-1) Modification Example A

In the above embodiment, the metabolic rate calculation unit 120 determines the attribute, the action, and the state amount of the person in the target space S on the basis of the captured image acquired by the image acquisition unit 110, and calculates the metabolic rate on the basis of determination results of these.

However, without limiting to this, the ventilation device control apparatus 100 may determine a part of the attribute, the action, and the state amount of the person in the target space S on the basis of the captured image acquired by the image acquisition unit 110, and may calculate the metabolic rate equivalent amount on the basis of a determination result.

For example, when only a certain person mainly uses the target space S, the metabolic rate calculation unit 120 need not determine the attribute of the person on the basis of the captured image acquired by the image acquisition unit 110. In this case, the metabolic rate calculation unit 120 may calculate the metabolic rate equivalent amount without using the attribute of the person. Further, in another example, the metabolic rate calculation unit 120 may use at least one of the action or the state amount of the person in the target space S determined on the basis of the captured image, and the attribute of the person registered in advance in the ventilation device control apparatus 100, to calculate the metabolic rate equivalent amount.

Further, for example, the ventilation device control apparatus 100 may calculate a metabolic equivalent (MET) that represents activity intensity as the metabolic rate equivalent amount, on the basis of an action of the person in the target space S (without determining the attribute or the state amount). Then, the ventilation device control apparatus 100 may adjust the ventilation volume of the target space S on the basis of the calculated MET.

(6-2) Modification Example B

In the above embodiment, the ventilation control unit 140 calculates a value of the ventilation volume and controls the ventilation device 10 to achieve the ventilation volume. However, without limiting to this, the ventilation control unit 140 may determine a degree of ventilation of the target space by the ventilation device 10 (for example, three stages of "large", "medium", and "small") on the basis of the metabolic rate or the like calculated by the metabolic rate calculation unit 120, and adjust the ventilation volume of the target space S by the ventilation device 10 by controlling the ventilation device 10 to realize the degree of ventilation.

The foregoing description concerns embodiments of the present disclosure. It will be understood that numerous modifications and variations may be made without departing from the gist and scope of the disclosure in the appended claims.

It is widely applicable and useful as a ventilation device control apparatus and a ventilation system.

What is claimed is:

1. A ventilation device control apparatus comprising:
   a processor,
   the processor being configured to:
      acquire a captured image from an image capturing device that captures an image of a target space;

calculate a metabolic rate equivalent amount of a person in the target space, based on the captured image;
calculate a ventilation volume of the target space by a ventilation device that ventilates the target space, based on the metabolic rate equivalent amount;
correct the ventilation volume based on a temporal change of the metabolic rate equivalent amount to obtain a corrected ventilation volume; and
control the ventilation device according to the corrected ventilation volume,
the processor correcting the ventilation volume such that the corrected ventilation volume is larger when the temporal change indicates that the metabolic rate equivalent amount is increasing than when the temporal change indicates that the metabolic rate equivalent amount is decreasing.

2. The ventilation device control apparatus according to claim 1, wherein
the processor is further configured to
determine at least one of age, gender, and a body type of the person in the target space as an attribute of the person in the target space based on the captured image, and
calculate the metabolic rate equivalent amount based on a determination result of the attribute.

3. The ventilation device control apparatus according to claim 2, wherein
the processor is further configured to
determine all of age, gender, and a body type of the person in the target space as the attribute of the person in the target space, and
calculate the metabolic rate equivalent amount based on the determination result of the attribute.

4. The ventilation device control apparatus according to claim 1, wherein
the processor is further configured to
determine an action during non-movement of the person in the target space based on the captured image, and
calculate the metabolic rate equivalent amount based on a determination result of the action during non-movement.

5. The ventilation device control apparatus according to claim 4, wherein
the person is a seated person, and
the processor is further configured to
determine an action of the seated person as the action during non-movement of the person in the target space based on the captured image, and
calculate the metabolic rate equivalent amount based on the determination result of the action.

6. The ventilation device control apparatus according to claim 4, wherein
the processor is further configured to
determine an action during movement of the person in the target space based on the captured image, and
calculate the metabolic rate equivalent amount further based on the determination result of the action during movement.

7. The ventilation device control apparatus according to claim 1, wherein
the processor is further configured to
determine at least one of a sweating amount and a heart rate of the person in the target space as a state amount of the person in the target space based on the captured image, and
calculate the metabolic rate equivalent amount based on a determination result of the state amount.

8. The ventilation device control apparatus according to claim 1, wherein
the processor is further configured to
calculate a distance between the person in the target space and the ventilation device, and
adjust the ventilation volume of the target space by the ventilation device further based on the distance.

9. The ventilation device control apparatus according to claim 2, wherein
the processor is further configured to
determine at least one of a sweating amount and a heart rate of the person in the target space as a state amount of the person in the target space based on the captured image, and
calculate the metabolic rate equivalent amount based on a determination result of the state amount.

10. The ventilation device control apparatus according to claim 2, wherein
the processor is further configured to
calculate a distance between the person in the target space and the ventilation device, and
adjust the ventilation volume of the target space by the ventilation device further based on the distance.

11. The ventilation device control apparatus according to claim 4, wherein
the processor is further configured to
determine at least one of a sweating amount and a heart rate of the person in the target space as a state amount of the person in the target space based on the captured image, and
calculate the metabolic rate equivalent amount based on a determination result of the state amount.

12. The ventilation device control apparatus according to claim 4, wherein
the processor is further configured to
calculate a distance between the person in the target space and the ventilation device, and
adjust the ventilation volume of the target space by the ventilation device further based on the distance.

13. The ventilation device control apparatus according to claim 7, wherein
the processor is further configured to
calculate a distance between the person in the target space and the ventilation device, and
adjust the ventilation volume of the target space by the ventilation device further based on the distance.

14. A ventilation system comprising:
an image capturing device configured to capture an image of a target space;
a ventilation device configured to ventilate the target space; and
a processor,
the processor being configured to:
acquire a captured image from the image capturing device;
calculate a metabolic rate equivalent amount of a person in the target space, based on the captured image acquired; and
calculate a ventilation volume of the target space by the ventilation device, based on the metabolic rate equivalent amount;
correct the ventilation volume based on a temporal change of the metabolic rate equivalent amount to obtain a corrected ventilation volume; and control the ventilation device according to the corrected ventilation volume, the processor correcting the ventilation volume such that the corrected ventilation volume is larger when the temporal change indicates that the metabolic rate equivalent amount is increasing than when the temporal change indicates that the metabolic rate equivalent amount is decreasing.

\* \* \* \* \*